(12) United States Patent
Wada et al.

(10) Patent No.: US 6,779,928 B2
(45) Date of Patent: Aug. 24, 2004

(54) METHOD FOR POLISHING END FACE OF FERRULE WITH OPTICAL FIBER, METHOD FOR ASSEMBLING OPTICAL CONNECTOR, AND TERMINATING KIT FOR OPTICAL FIBER

(75) Inventors: Masanori Wada, Otsu (JP); Hirokazu Takeuchi, Youkaichi (JP); Azusa Tanaka, Shiga-ken (JP)

(73) Assignee: Nippon Electric Glass Co., Ltd., Shiga-ken (JP)

( * ) Notice: Subject to any disclaimer, the term of this patent is extended or adjusted under 35 U.S.C. 154(b) by 12 days.

(21) Appl. No.: 10/338,998

(22) Filed: Jan. 8, 2003

(65) Prior Publication Data
US 2003/0156799 A1 Aug. 21, 2003

(30) Foreign Application Priority Data

Jan. 8, 2002 (JP) ........................................ 2002-001321

(51) Int. Cl.[7] ................................................ G02B 6/36
(52) U.S. Cl. ........................................................ 385/85
(58) Field of Search ............................... 385/85, 60, 61, 385/72, 74, 78, 79

(56) References Cited

U.S. PATENT DOCUMENTS

| 5,481,634 | A | * | 1/1996 | Anderson et al. ............. 385/76 |
| 5,838,857 | A | * | 11/1998 | Niekrasz ....................... 385/60 |
| 6,158,900 | A | * | 12/2000 | Omiya et al. .................. 385/78 |
| 6,276,842 | B1 | * | 8/2001 | Xu et al. ........................ 385/78 |
| 6,419,810 | B1 | * | 7/2002 | Tanaka et al. ................. 385/60 |
| 6,443,827 | B1 | * | 9/2002 | Ryoke et al. ................. 451/533 |
| 6,450,696 | B1 | * | 9/2002 | Omiya et al. .................. 385/72 |
| 6,478,477 | B1 | * | 11/2002 | Yamaguchi ................... 385/80 |
| 6,556,733 | B2 | * | 4/2003 | Dy et al. ....................... 385/15 |

FOREIGN PATENT DOCUMENTS

| JP | 11277450 A | * | 10/1999 | ........... B24D/11/00 |
| JP | 2000121846 A | * | 4/2000 | ............ G02B/6/10 |

* cited by examiner

Primary Examiner—Michael G. Lee
Assistant Examiner—Uyen-Chau N. Le
(74) Attorney, Agent, or Firm—J.C. Patents (57) ABSTRACT

A ferrule with optical fiber is held to a ferrule holder. The ferrule is made of a material with 0.5~2 times the wearing speed characteristic in comparison with a quartz glass. The ferrule holder comprises a polishing plate which has an elastic module equivalent to 70~95 degrees of rubber hardness in a state of adhering a polishing sheet thereon. The ferrule holder is made to be self-supported on a polishing table in a manner such that the end face of the ferrule with optical fiber is in contact with the polishing sheet. The ferrule holder is made to manually move on the polishing table by a predetermined distance in the horizontal direction to slide the end face of the ferrule with optical fiber on the polishing sheet, thereby the end face of the ferrule with optical fiber is polished to a spherical convex surface centered on the optical fiber.

6 Claims, 5 Drawing Sheets

METHOD FOR POLISHING END FACE OF FERRULE WITH OPTICAL FIBER, METHOD FOR ASSEMBLING OPTICAL CONNECTOR, AND TERMINATING KIT FOR OPTICAL FIBER

CROSS-REFERENCE TO RELATED APPLICATION

This application claims the priority benefit of Japanese application serial no. 2002-001321, filed on Jan. 8, 2002.

BACKGROUND OF THE INVENTION

1. Field of the Invention

This invention relates in general to a method for polishing end face of ferrule with optical fiber to a spherical convex surface that is capable of physical contact (PC) connection to suppress reflection light, a method for assembling optical connector, and an optical fiber terminating kit.

2. Description of Related Art

Recently, as the demand for information communication increases, the preparation for optical fiber networks goes ahead. To build an optical fiber network, for a place where the optical fiber does not need to be detachable, a fusion connection where the optical fiber is fused to connect by a splice device or adhesion connection is performed. In contrast, a detachable optical connector is used on a portion that is presumed to allow for the exchange of the communication machine due to property division or maintenance.

The aforementioned optical connector is usually adhered on an end portion of an optical fiber with a predetermined length in the factory. As an optical connector with cable sold in the market, it is used for building the optical fiber network.

Furthermore, when laying the optical fiber cable with undetermined length, or when changing the length of the optical fiber, or when the wiring work of the optical fiber cable as the layout in the building is changed or in process, for a portion that is presumed to allow for the exchange of the communication device due to property division or maintenance, it is necessary to attach an optical connector to the end portion of the optical fiber cable and then to terminate the optical fiber cable in the field. In such a situation, a portable and simple optical connector assembling kit is required to be carried to the field.

Recently, as the demand for communication of information increases greatly, even though the optical fiber cable is terminated in the field, a high quality in optical connector connection is requested. The end face of the optical connector attached to the end portion of the optical fiber cable has to be finished in the field to a spherical convex surface centered on the end face of the core of the optical fiber so as to be capable of PC connection. Moreover, in order to achieve such a PC connection that scarcely induces the returning light due to the reflection from the connection end faces, i.e., that is improved in performance relevant to return loss, and that is able to obtain a sufficiently small connection loss even for the single mode optical fiber having a core diameter equal to or less than 10 μm, the specification of the spherical convex surface of the optical connector after the PC polishing is rigorously regulated.

Conventionally, in order to satisfy such rigorously regulated specification of the spherical convex surface of the optical connector, a polishing device specially designed for PC polishing has been used. Because such a specially designed polishing device requires a power source, it is difficult to use for assembling the optical connector in the field. In addition, a battery-type portable simple polishing device is proposed. However, not only has the battery to be frequently exchanged, but also the maintenance for the polishing device constructed by many accurate parts is almost impossible in the field. Because the polishing device has to be taken back for maintenance, it is not convenient. Furthermore, in the case that a polishing device specially designed for the PC polishing is carried to the field, even though for a comparatively small-size polishing device, the preparation of the power source and a sufficient working space are required, so that there is a problem that the space capable of polishing is limited.

Additionally, because the hardness of a ferrule made of zirconia ceramic, which is generally used for an optical connector assembled in the factory, is high, it needs too much time to finish the end face in the field from a planar face to a spherical convex surface centered on the end face of the core of the optical fiber that is capable of PC connection. Therefore, when using the ferrule made of zirconia ceramic, the end face of the ferrule is processed in advance to a preliminary spherical convex surface, a so-called pre-doom. However, the ferrule made of zirconia ceramic where a special process is performed thereon is high in cost. In addition, since the hardness of the optical fiber of quartz system, etc. is lower than the hardness of zirconia ceramic, when employing the conventional plane polishing method, the end face of the optical fiber wears earlier than the end face of the ferrule to be drawn in the ferrule. As a result, a polishing method using a specially designed polishing device with special specification is required, and therefore, there is a problem that the entire cost increases.

For safety, when electricity is forbidden, to grind manually for a long time is necessary. Furthermore, since it is possible for only a skilled worker to finish the end face of the optical fiber to a required spherical convex surface so as to be capable of PC connection within a predetermined connection loss. Thus, in any case, there is a problem that the assembling cost for the optical connector is obviously increased.

SUMMARY OF THE INVENTION

According to the foregoing description, an object of this invention is to provide a method for polishing ferrule with optical fiber, a method for assembling optical connector, and an optical fiber terminating kit, which can be possible to polish an end face of a ferrule with optical fiber to a highly accurate spherical convex surface capable of PC connection, in the field where the connection with the optical connector is required.

According to the object(s) mentioned above, the present invention provides a method for polishing end face of ferrule with optical fiber, in which an optical fiber is inserted in an inner hole of a ferrule, comprising the steps of holding the ferrule with optical fiber to a ferrule holder, the ferrule holder having a predetermined mass and substantially vertically holding the ferrule with optical fiber to be self-supported with the end face of the ferrule with optical fiber as a supporting point, the ferrule being made of a material with 0.5~2 times the wearing speed characteristic in comparison with a quartz glass, making the ferrule holder to be self-supported on a polishing table having a polishing plate which has an elastic module equivalent to 70~95 degrees of rubber hardness in a state of adhering a polishing sheet thereon, in a manner such that the end face of the ferrule with optical fiber is in contact with the polishing sheet, and manually moving the ferrule holder on the polishing table by a predetermined distance in the horizontal direction to slide the end face of the ferrule with optical fiber on the polishing sheet, thereby polishing the end face of the ferrule with optical fiber to a spherical convex surface centered on the optical fiber.

The conventional ferrule made of zirconia ceramic has only one-fifth wearing speed of quartz glass, and therefore is not suitable for the present invention. A ferrule made of a material, such as borosilicate glass, crystallized glass, plastic, ceramic and metal, etc. that has 0.5~2 times of the wearing speed characteristic as compared with the quartz glass, is suitable for use for the polishing method of the present invention. In particular, as for the reduction of working time for assembling in the field, a glass ferrule, which is transparent to the ultraviolet ray and the like with a high sensitivity to an optical curing adhesive, is preferred. In addition, as compared with the quartz glass, the ferrule composed of crystallized glass of lithia-alumina-silicate that has 0.5~1.1 times of wearing speed characteristic is suitable in view of high reliability in attachment and detachment.

The ferrule holder preferably comprises a chucking means for substantially vertically holding the ferrule with optical fiber detachably. It is important that the ferrule holder can be self-supported with the end face of the ferrule with optical fiber as a supporting point, in such a manner that the held ferrule with optical fiber serves as a leg for supporting the ferrule holder. When one ferrule with optical fiber is held, another portion for supporting the ferrule holder has preferably a configuration of two points or line-shaped. When two ferrules with the optical fiber are held, another portion for supporting the ferrule holder has preferably a configuration of one point. In addition, when three ferrules with optical fiber are held, the ferrule holder can be self-supported with the end faces of the three ferrules with optical fiber as supporting points. Namely, in any one of the above cases, it is preferred that the ferrule holder is supported by substantially three points so as to apply a predetermined load uniformly to the end face of the ferrule with optical fiber. Furthermore, for manually moving the ferrule holder that holds the ferrule with optical fiber on the polishing table by a predetermined distance in the horizontal direction to slid, it is preferred that the supporting point (or points) other than the ferrule (or ferrules) with the optical fiber is (are) processed in a spherical-shaped and the like, so that the supporting point (points) can slide smoothly with respect to the polishing table. In addition, a grease-like lubricant and the like which is easy to clean away may be also used. Any ferrule holder can be used, as for as the mass thereof is set within a range such that the polishing plate is deformed to a predetermined concave sphere shape to contact with the end face of the ferrule with optical fiber to be polished. It is preferred for the mass of the ferrule holder that it can reduce the polishing time and has no adverse influence on the quality of the spherical convex shape formed on the end face of the ferrule with optical fiber and on the quality of the surface roughness of the end face of the optical fiber.

Any polishing plate where the polishing sheet is adhered thereon can be used, as far as it has a predetermined elasticity to deform to a predetermined substantially spherical concave surface when the end face of the ferrule with optical fiber being substantially vertically held by the ferrule holder with a predetermined mass is in contact with the polishing plate. It is preferred that the polishing plate is made of a material having a hardness of 70~95 degrees regulated by JIS K-6253: "method for testing the hardness of the vulcanized rubber and thermal plastic rubber", or JIS K-7215: "durometer hardness testing method for plastic" in the state of the polishing sheet being adhered thereon, for example, is made of a synthetic rubber, such as urethane rubber, silicon rubber, and Viton rubber. In addition, it is necessary for the polishing plate to have a thickness that is able to deform to a predetermined substantially spherical concave surface when the end face of the ferrule with optical fiber is made to contact with the polishing plate. Although the thickness of the polishing plate depends on the elastic module or the Poisson ratio, but generally, when the thickness is equal to or greater than 2 mm, obstacles, such as a desired spherical surface cannot be obtained due to the influence of the hard material under the rubber plate, do not occur in use.

A film made of plastic, such as PET, with a thickness of 25~125 $\mu$m on which abrasive grains are fixed is preferable for the polishing sheet, since it can deform along the end face of the ferrule with the optical fiber. As for the abrasive grain, depending on the polishing stage, SiC of #2000 with a high hardness, $Cr_2O_3$ of #8000 with a moderate hardness, and $Fe_2O_3$ or $SiO_2$ of #20000 that has been used in finishing process as red oxide from ancient time, are respectively suitable. Additionally, if required, the abrasive grain that is in well usage, such as diamond, CBN, borazone, or ALUNDUM ($Al_2O_3$), etc., may be also employed.

It is preferred that the polishing table has an upper surface (planer surface), which is parallel to the polishing plate on which the polishing sheet is adhered and has an area where the movable range of the ferrule holder can be secured. The upper surface is preferable to have a flatness and surface roughness so that the ferrule holder can slide smoothly thereon. Preferably, an outer frame, or a guide with which a portion of the ferrule holder is movably engaged is disposed, so that the ferrule holder is not easily detached from the upper surface.

In addition, the present invention further provides a method for assembling optical connector, wherein an optical fiber, whose covering portion with a predetermined length is removed, is inserted in a ferrule to be fixed by an adhesive in a manner such that a front end portion of the optical fiber protrudes from the ferrule, and then an end face of the ferrule with optical fiber is polished to a spherical convex surface centered on the optical fiber, and further a protection member is mounted thereon, comprising the steps of holding the ferrule with optical fiber to a ferrule holder, the ferrule being made of a material with 0.5~2 times the wearing speed characteristic in comparison with a quartz glass, the ferrule holder having a predetermined mass and substantially vertically holding the ferrule with optical fiber to be self-supported with the end face of the ferrule with optical fiber as a supporting point, making the ferrule holder to be self-supported on a polishing table having a polishing plate which has an elastic module equivalent to 70~95 degrees of rubber hardness in a state of adhering a polishing sheet thereon, in a manner such that the end face of the ferrule with optical fiber is in contact with the polishing sheet, and manually moving the ferrule holder on the polishing table by a predetermined distance in the horizontal direction to slide the end face of the ferrule with optical fiber on the polishing sheet, thereby polishing the end face of the ferrule with optical fiber to a spherical convex surface centered on the optical fiber.

In the assembling method for optical connector of the present invention, a predetermined length of the covering portion of the optical fiber is first removed so that the optical fiber will protrude by several millimeter (mm) from the front end of the ferrule. Then, the surface of the naked optical fiber is cleaned so that the optical fiber can be inserted to a precise inner hole of the ferrule. Next, the ferrule or/and the optical fiber in which the covering portion with the predetermined length has been removed is previously applied with adhesive. Then, the optical fiber is inserted in the inner hole of the ferrule to be fixed by hardening adhesive in the state of the front end of the optical fiber protruding from the end face of the ferrule. At this time, it is important that the front end of the optical fiber is protruded from the end face of the ferrule and the protruded part thereof is fixed by adhesive in order to prevent the optical fiber from being damaged in the inner hole of the ferrule.

Moreover, in the assembling method for optical connector of the present invention, it is important that the end face of the ferrule with optical fiber of the optical connector is polished to a substantially spherical convex surface with a high accuracy centered on the core of the optical fiber by the aforementioned polishing method for ferrule with optical fiber.

The present invention further provides an optical fiber terminating kit for polishing an end face of a ferrule with optical fiber, in which an optical fiber is inserted in an inner hole of a ferrule, to a spherical convex surface centered on the optical fiber, comprising a ferrule holder having a predetermined mass and substantially vertically holding the ferrule with optical fiber to be self-supported with the end face of the ferrule with optical fiber as a supporting point, the ferrule being made of a material with 0.5~2 times the wearing speed characteristic in comparison with a quartz glass, and a polishing table having a polishing plate which has an elastic module equivalent to 70~95 degrees of rubber hardness in a state of adhering a polishing sheet thereon, wherein the optical fiber terminating kit polishes the end face of the ferrule with optical fiber to a spherical convex surface centered on the optical fiber.

The entire optical fiber terminating kit of the present invention is compact so that the kit can be carried in a field where the electricity cannot be used, a narrow field, or a high field, etc. Except that the ferrule holder requires the predetermined mass, it is preferred that components of the kit are made light in weight while securing strength thereof enough for maintaining the polishing property.

According to the method for polishing ferrule with optical fiber of the present invention, even though in the worse condition of workability, such as a field without a space to dispose a desk-top polishing device, etc., or a field without an electricity power, the PC polishing for an optical connector having desired properties of the connection loss and the reflection attenuation can be easily performed.

According to the method for assembling optical connector of the present invention, even though in the worse condition of workability, such as a field without a space to dispose a desk-top polishing device, etc., or a field without an electricity power, the PC polishing for an optical connector having desired properties of the connection loss and the reflection attenuation can be easily performed. Thus, the assembling for an optical connector, which is durable for a long time use and has excellent reflection attenuation property can be performed.

According to the optical fiber terminating kit of the present invention, the equipment cost can be significantly reduced in comparison with the conventional equipments. In addition, the optical fiber terminating kit of the present invention is easy to carry due to lightness in weight. Further, the optical fiber terminating kit of the present invention make it easy to perform the PC polishing for an optical connector having desired properties of the connection loss and the reflection attenuation, even though in the worse condition of workability, such as a field without a space to dispose a desk-top polishing device, etc., or a field without an electricity power. Thus, it is possible to terminate the optical fiber composing an optical connector that is capable of the PC connection suitable for a large capacity communication.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

FIGS. 1A and 1B show the preparation for a ferrule with optical fiber using an optical fiber terminating kit of the present invention, of which

FIGS. 2A and 2B show the optical fiber terminating kit of an embodiment of the present invention, of which

FIGS. 3A and 3B show the optical fiber terminating kit of another embodiment of the present invention, of which

FIGS. 4A and 4B show the optical fiber terminating kit of still another embodiment of the present invention, of which

FIGS. 5A~5C show a method for assembling optical connector of the present invention, of which

DESCRIPTION OF THE PREFERRED EMBODIMENT

A ferrule 1, for example, made of borosilicate glass is prepared, wherein the ferrule 1 contains about 5 mass % of $Na_2O$ that can be strengthened by an ion exchange process, and has a thermal expansion coefficient of $5 \times 10^{-6}$/K, a Vickers hardness of 680 $kgf/mm^2$, and allows equal to or more than 80% of light in the range from near ultraviolet light to blue light with a wavelength of 350 nm~500 nm to pass therethrough at a thickness of 1 mm.

Figure 1A:
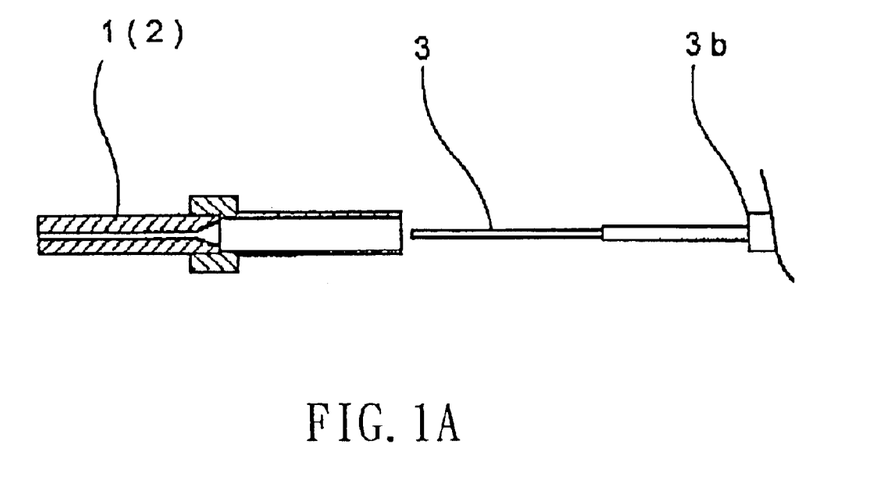
FIG. 1A is a cross sectional view showing the insertion of the optical fiber.
Figure 1B:
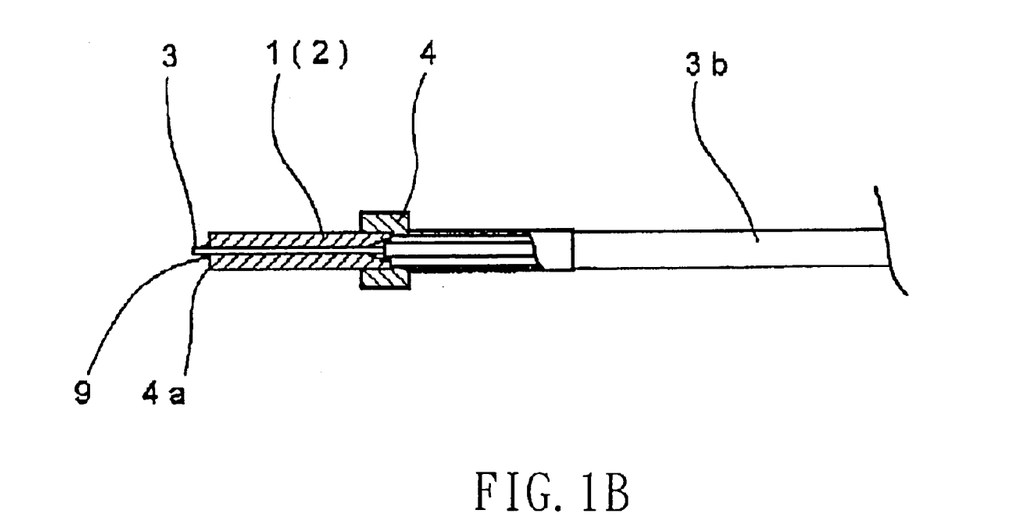
FIG. 1B is a cross sectional view showing the ferrule with optical fiber.

The optical fiber terminating kit comprises a carrying case (not shown), tools for removing a covering portion 3b of a optical fiber 3, adhesive, tools for hardening the adhesive, alcohol, and inspection tools for an end face of an optical connector and the like. Referring to FIGS. 1A and 1B, the covering portion 3b of the optical fiber 3 is removed by an processing tool, and then the optical fiber 3 is inserted and fixed in the ferrule 1, which is made of the transparent borosilicate glass with 1.0~1.8 times (for example, 1.4 times) the wearing speed characteristic as compared with the quartz glass, by the adhesive 9. In this process, an ultraviolet curing adhesive, as the adhesive 9, is coated in the ferrule 1 and then hardened by an ultraviolet lamp, thereby the optical fiber can be fixed within several ten seconds.

Figure 2A:
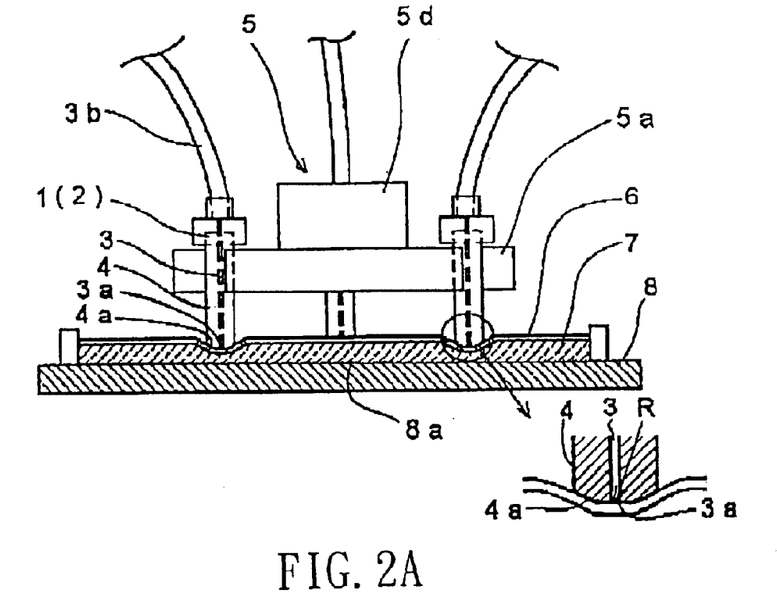
FIG. 2A is a side view (partially sectional view) and FIG. 2B is a plane view (partially breaking view)
Figure 2B:
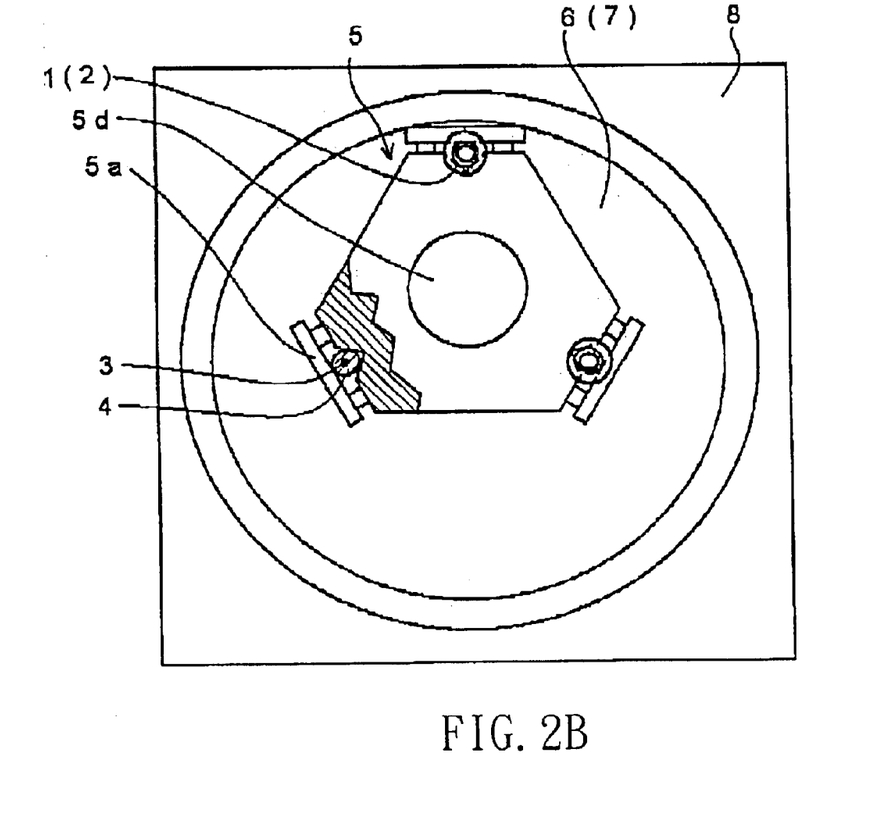

As shown in FIGS. 2A and 2B, the optical fiber terminating kit comprises a ferrule holder 5 and a polishing table 8. The ferrule holder 5 has a predetermined mass and substantially vertically holds the ferrules with optical fiber 4, in which the optical fiber 3 is inserted, to be self-supported with end faces 4a of the ferrules with optical fiber 4 as supporting points. The polishing table 8 comprises a polishing plate 7 that has a predetermined elastic module in a state of adhering a polishing sheet 6 on a planer surface thereof. The end faces 4a of the ferrules with optical fiber 4 are polished to spherical convex surfaces centered on end faces 3a of the optical fibers 3.

The ferrule holder 5 comprises a chucking means 5a for detachably holding the ferrules with optical fiber 4 in a substantially vertical attitude. The held ferrules with optical fiber 4 serve as legs for supporting the ferrule holder 5. When holding three ferrules with optical fiber 4 for polishing, the ferrule holder 5 is self-supported with three end faces 4a of the ferrules with optical fiber 4.

Figure 3A:
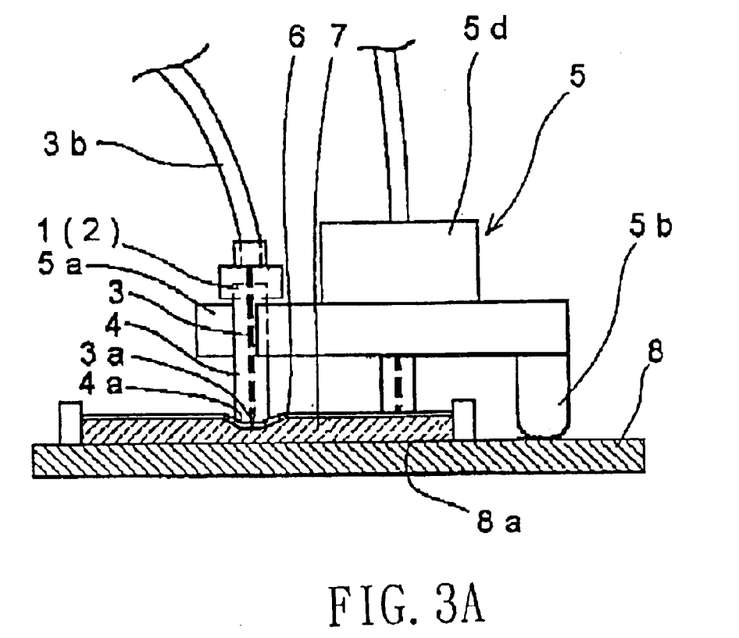
FIG. 3A is a side view (partially sectional view) and FIG. 3B is a plane view (partially breaking view)
Figure 3B:
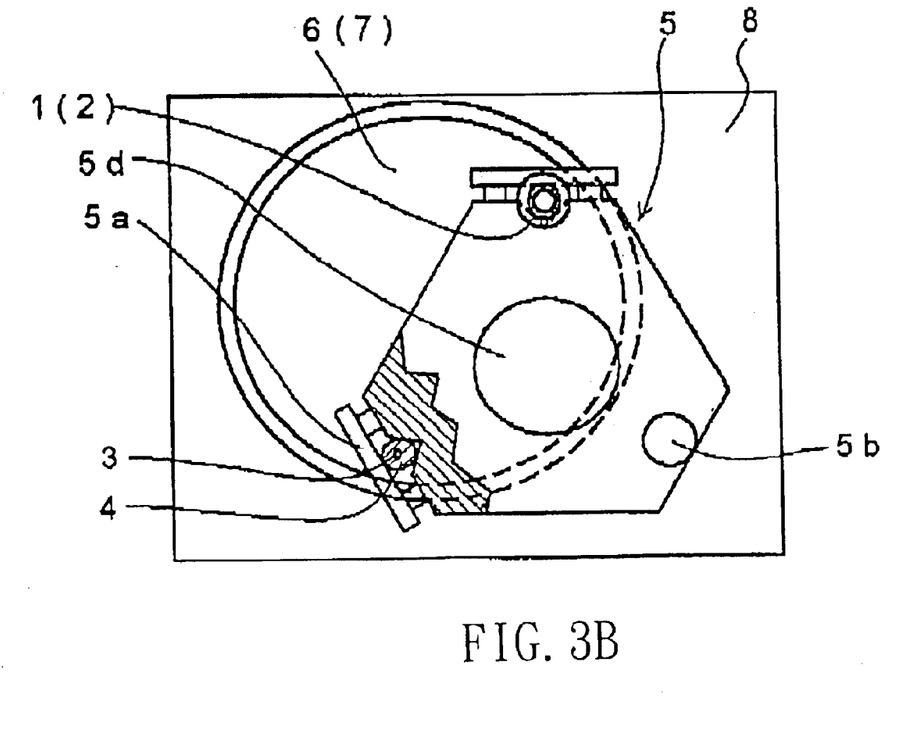
Figure 4A:
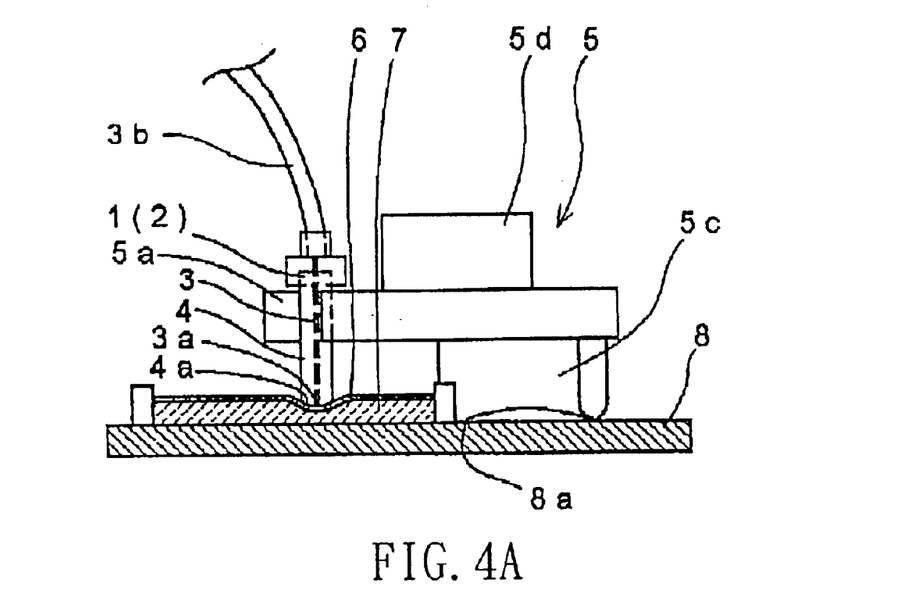
FIG. 4A is a side view (partially sectional view) and FIG. 4B is a plane view (partially breaking view)
Figure 4B:
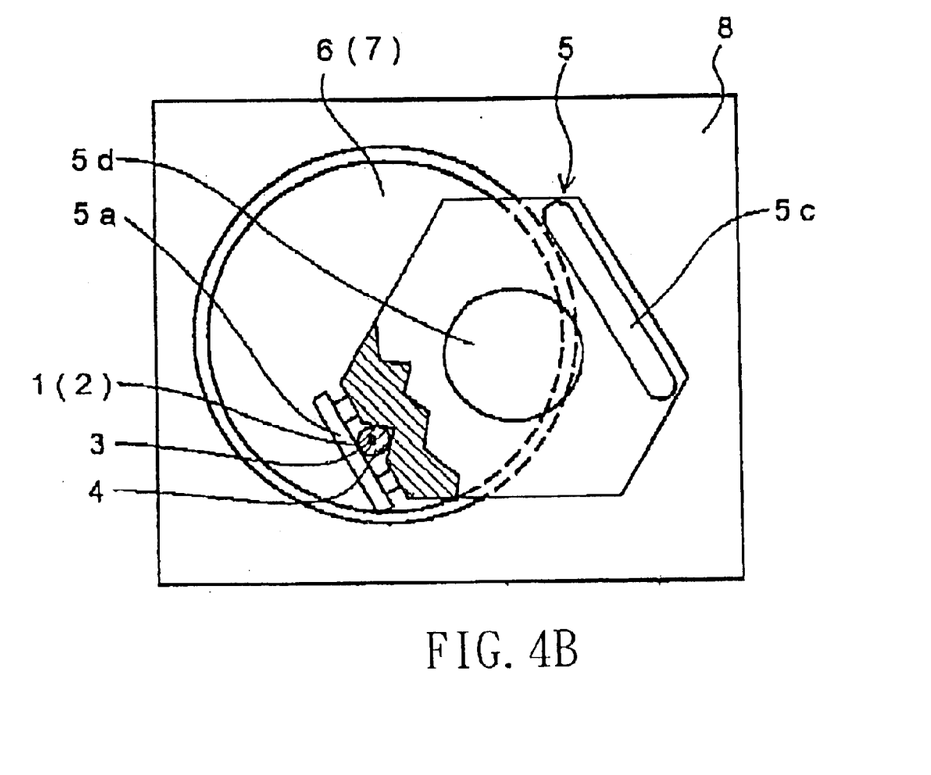

When holding two ferrules with optical fiber 4 for polishing, as shown in FIGS. 3A and 3B, another supporting portion 5b is disposed for supporting the ferrule holder 5 by one point. When holding one ferrule with optical fiber 4 for polishing, as shown in FIGS. 4A and 4B, another supporting portion 5c is disposed for supporting the ferrule holder 5 by two points, or by a line shape. In this way, by using the three-points supporting structure where the ferrule holder 5 is supported by three points of the end faces 4a of the ferrules with optical fiber 4, by two points of the end faces 4a of the ferrules with optical fiber 4 and one point of the supporting portion 5b, or one point of the end face 4a of the ferrule with optical fiber 4 and two points or line shape of the supporting portion 5c, a predetermined load weight is applied on each of the end faces 4a of the ferrules with optical fiber 4 constantly and substantially equally.

It is preferred that the supporting point other than the ferrule with optical fiber 4 is processed to a spherical shape, etc., so that the supporting point is able to smoothly slide on the polishing table 8, when manually moving the ferrule holder 5 holding the ferrule with optical fiber 4 by a predetermined distance to slide on the polishing table 8 in the horizontal direction. A grease-like or gel-like lubricant, which is easy to clean away and hard to drip off or spill out, may also be used. In addition, the supporting point may be provided with ball (s) having a proper rolling friction.

It is preferred that the ferrule holder 5 is provided with an exchangeable weight 5d for suitably adjusting the mass of the ferrule holder 5 so as to apply a load weight of 20~150 gf/mm$^2$ on each one ferrule with optical fiber 4. Thereby, the ferrule holder 5 becomes to be easy to use for ferrules having various diameters of end faces and being made of various materials. The material and the thickness of the polishing plate 7 are determined such that elastic module of the surface, when the polishing sheet 6 is adhered thereon, is equivalent to 70~95 degrees of rubber hardness. For example, the polishing sheet 6 using a base film made of PET with a thickness 75 μm is adhered on the polishing plate 7 made of Viton rubber with 80 degrees of rubber hardness and thickness 5 mm, so that the surface of the polishing plate 7 becomes to be 82 degrees of rubber hardness. As the end face 4a of the ferrule with optical fiber 4 to be polished is in contact with the polishing plate 7, the polishing plate 7 is bent to a predetermined spherical concave surface having an apparent curvature radius R of 10~25 mm for the MU type and the SC type optical connectors, an apparent curvature radius R of 7~25 mm for the LC type optical connector, so that the end face 4a of the ferrule with optical fiber 4 can be polished to a spherical convex surface having a predetermined apparent curvature radius suitable for the respective type of optical connector.

The method of the embodiment is explained more specifically. The polishing plate 7 having 80 degrees of rubber hardness was used. The polishing sheet 6 was composed of a base film made of PET with a thickness of 0.75 mm. The polishing sheet 6 had abrasive grains of SiC of #2000 in count for the first process, abrasive grains of $Cr_2O_3$ of #8000 for the second process, and abrasive grains of $Fe_2O_3$ of #20000 for the third process, respectively. For example, three ferrules with optical fiber 4 composed of the glass ferrule 1 made of φ1.25 mm borosilicate glass were simultaneously polished.

As showing in FIGS. 2A and 2B, the weight 5d of the ferrule holder 5 was adjusted so that a load of 50 gf was respectively applied on each of the three end faces 4a of the ferrules with optical fiber 4. Then, the polishing process was performed with a linear velocity of about 120 revolutions per minute such that substantially circular orbits with a radius of 10 mm were almost not overlapped and deviated from each other by each revolution to trace a coiled trajectory. In the first process, 50 revolutions were processed to polish and completely remove the surplus adhesive 9 remained on the end face 4a. In the second process, 120 revolutions were processed to form a substantially spherical convex surface having a predetermined apparent curvature radius R. In the third process, 200 revolutions were processed to polish and finish the end face 4a with a predetermined surface roughness, so that the ferrule with optical fiber 4 capable of PC connection was finished.

Then, the PC polished and finished end face 4a of the ferrule with optical fiber 4 was observed by a microscope with a 400 magnifying power, however, any damages during the process are not observed.

Figure 5A:
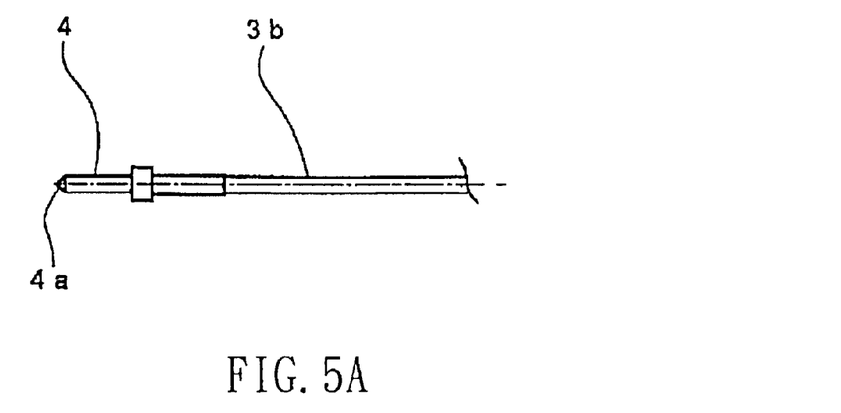
FIG. 5A is a side view of a PC polished ferrule with optical fiber.
Figure 5B:
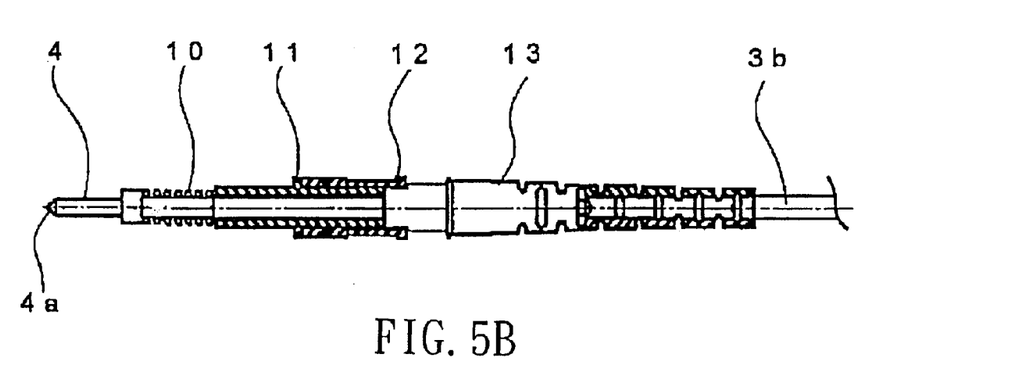
FIG. 5B is a cross sectional view showing a state of an insertion member being mounted on the ferrule with optical fiber.
Figure 5C:
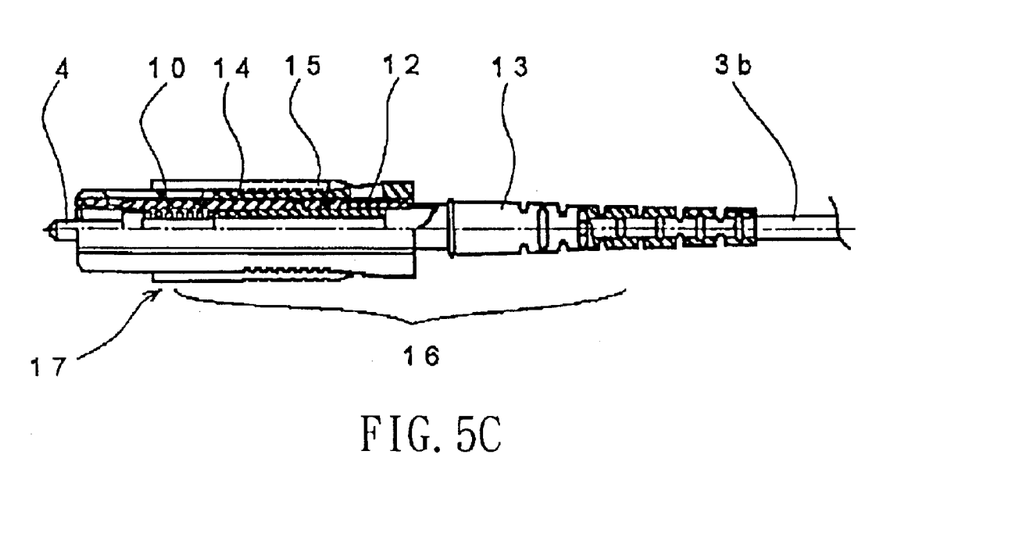
FIG. 5C is a cross sectional view showing the assembled optical connector.

Next, with respect to the ferrule with optical fiber 4 shown in FIG. 5A, which was PC polished, as shown in FIG. 5B, a coil spring 10, a stop ring 11, a caulking ring 12, and a boot 14, which was used as protection members, were mounted on the covering portion 3b of the optical fiber 3. Then, as shown in FIG. 5C, housing members, such as a plug housing 14 and a thumbscrew 15, etc., were mounted thereon to assemble the optical connector 17.

The optical connector 17, to which the optical fiber terminating kit, the polishing method and the assembling method of the embodiments were applied, had an apparent curvature radius R of 15~18 mm, a spherical eccentricity of 20~25 μm and a protruding amount of the optical fiber 3 of 30~40 nm. Thus, the optical connector 17 sufficiently satisfied the shape specification of the end face required in a optical connector with spherical convex surface for PC connection, and the condition of the polished end face 4a thereof was very good so that any defections was not observed. In addition, the connection loss of the optical connector 7 was 0.01~0.20 dB, and its average value was 0.13 dB, and 3σ (3 times the standard deviation) was 0.03 dB, which were very small. All reflection attenuation amounts were greater or equal to 55 dB, and therefore, a very excellent connection characteristic was obtained.

As a comparison example, three conventional ferrules made of zirconia ceramic were used. A polishing process for the ferrule with optical fiber having the same conditions and dimensions as the embodiment was performed, and then the optical connector was assembled to perform the same evaluation as described above.

In the process for polishing the end face of the ferrule made of zirconia ceramic, even though about five times the time lapsed, the predetermined spherical convex shape of the end face was not formed and was still almost the planar shape. Furthermore, there were a lot of damages observed on the polished end face. In addition, when optical connectors using such ferrules with optical fibers were connected to each other, the reflection light from the connected end faces was strong and the reflection attenuation amount was below the detectable limit, therefore, it was unusable.

In addition, the optical fiber terminating kit of the embodiment can also be used for the crystallized glass ferrule 2 containing the composition shown in Table 1. In comparison with the quartz glass forming the optical fiber 3, the crystallized glass ferrule 2 has 0.5~1.1 times (for example, 0.8 times) the wearing speed characteristic. Except for the adhesive, the same method for the glass ferrule 1 described in FIGS. 1A~5C can be applied to the crystallized glass ferrule 2.

TABLE 1

|  |  | Sample No. | | | | |
| --- | --- | --- | --- | --- | --- | --- |
|  |  | 1 | 2 | 3 | 4 | 5 |
| glass composition (mass %) | $SiO_2$ | 57.8 | 66.3 | 67.4 | 64.3 | 65.9 |
|  | $Al_2O_3$ | 24.6 | 18.2 | 16.6 | 18.0 | 18.2 |
|  | $Li_2O$ | 2.7 | 2.3 | 2.3 | 2.5 | 2.0 |
|  | $K_2O$ | 7.0 | 3.4 | 3.5 | 5.0 | 3.4 |
|  | $TiO_2$ | 2.8 | 1.8 | 3.0 | 3.0 | 1.5 |
|  | $ZrO_3$ | 3.2 | 1.8 | 1.8 | 2.0 | 1.8 |
|  | ZnO | 1.0 | 3.1 | 2.0 | 3.1 | 3.8 |
|  | MgO | — | 1.0 | 1.0 | 1.0 | 1.5 |
|  | CaO | — | — | — | 0.4 | 0.6 |
|  | BaO | — | — | — | 0.5 | 1.4 |
|  | $Ba_2O_3$ | — | — | 2.0 | — | — |
|  | $Na_2O$ | 0.4 | — | — | — | — |
|  | $P_2O_5$ | — | — | 0.4 | — | — |
|  | $As_2O_3$ | 0.5 | — | — | 0.2 | 0.1 |
|  | $Bi_2O_3$ | — | 2.1 | — | — | — |
| crystallization condition (° C.) |  |  |  |  |  |  |
| nuclear forming temperature |  | 780 | 780 | 790 | 780 | 780 |
| crystal growing temperature |  | 1000 | 1000 | 980 | 1050 | 1000 |
| main crystal |  | β-quartz solid solution | β-spodumen solid solution | β-spodumen solid solution | β-spodumen solid solution | β-spodumen solid solution |

According to the polishing method for ferrule with optical fiber of the present invention, it is not necessary to perform a pre-dome process in advance on the ferrule, so that a optical connector made of a material low in price can be used, while performing the PC polishing process of the optical connector easily to obtain a desired connection loss and reflection attenuation property.

In addition, according to the assembling method for optical connector, a previously pre-dome processed ferrule is not necessary, so that a optical connector made of a material low in price can be used, while performing the PC polishing process of the optical connector easily to obtain a desired connection loss and reflection attenuation property. Therefore, it is able to assemble the optical connector having an excellent reflection attenuation characteristic.

According to the optical fiber terminating kit of the present invention, the equipment cost can be significantly reduced in comparison with the conventional equipments. In addition, the optical fiber terminating kit of the present invention is easy to carry due to lightness in weight. Further, since the optical fiber terminating kit of the present invention make it easy to finish an end face of a ferrule with optical fiber to the PC polishing end face, it is excellent in practice use for easily terminating an optical fiber as an component of a optical connector to have an excellent properties of the connection loss and the reflection attenuation.

What is claimed is:

1. A method for polishing end face of ferrule with optical fiber, in which an optical fiber is inserted in an inner hole of a ferrule, comprising the steps of:

holding the ferrule with optical fiber to a ferrule holder, the ferrule holder having a predetermined mass and substantially vertically holding the ferrule with optical fiber to be self-supported with the end face of the ferrule with optical fiber as a supporting point, the ferrule being made of a material with 0.5~2 times the wearing speed characteristic in comparison with a quartz glass;

making the ferrule holder to be self-supported on a polishing table having a polishing plate which has an elastic module equivalent to 70~95 degrees of rubber hardness in a state of adhering a polishing sheet thereon, in a manner such that the end face of the ferrule with optical fiber is in contact with the polishing sheet; and manually moving the ferrule holder on the polishing table by a predetermined distance in the horizontal direction to slide the end face of the ferrule with optical fiber on the polishing sheet, thereby polishing the end face of the ferrule with optical fiber to a spherical convex surface centered on the optical fiber.

2. The method for polishing end face of ferrule with optical fiber according to claim 1, wherein a plurality of ferrules with optical fiber are held to the ferrule holder.

3. The method for polishing end face of ferrule with optical fiber according to claim 2, wherein the ferrule holder is made to be self-supported with three ferrules with optical fiber held thereto.

4. The method for polishing end face of ferrule with optical fiber according to claim 1, wherein the ferrule holder is made to be self-supported with three ferrules with optical fiber held thereto.

5. A method for assembling optical connector, wherein an optical fiber, whose covering portion with a predetermined length is removed, is inserted in a ferrule to be fixed by an adhesive in a manner such that a front end portion of the optical fiber protrudes from the ferrule, and then an end face of the ferrule with optical fiber is polished to a spherical convex surface centered on the optical fiber, and further a protection member is mounted thereon, comprising the steps of:

holding the ferrule with optical fiber to a ferrule holder, the ferrule being made of a material with 0.5~2 times the wearing speed characteristic in comparison with a quartz glass, the ferrule holder having a predetermined mass and substantially vertically holding the ferrule with optical fiber to be self-supported with the end face of the ferrule with optical fiber as a supporting point;

making the ferrule holder to be self-supported on a polishing table having a polishing plate which has an elastic module equivalent to 70~95 degrees of rubber hardness in a state of adhering a polishing sheet thereon, in a manner such that the end face of the ferrule with optical fiber is in contact with the polishing sheet; and manually moving the ferrule holder on the polishing table by a predetermined distance in the horizontal direction to slide the end face of the ferrule with optical fiber on the polishing sheet, thereby polishing the end face of the ferrule with optical fiber to a spherical convex surface centered on the optical fiber.

6. An optical fiber terminating kit for polishing an end face of a ferrule with optical fiber, in which an optical fiber is inserted in an inner hole of a ferrule, to a spherical convex surface centered on the optical fiber, comprising:

a ferrule holder having a predetermined mass and substantially vertically holding the ferrule with optical fiber to be self-supported with the end face of the ferrule with optical fiber as a supporting point, the ferrule being made of a material with 0.5~2 times the wearing speed characteristic in comparison with a quartz glass; and a polishing table having a polishing plate which has an elastic module equivalent to 70~95 degrees of rubber hardness in a state of adhering a polishing sheet thereon, wherein the optical fiber terminating kit polishes the end face of the ferrule with optical fiber to a spherical convex surface centered on the optical fiber.

* * * * *